United States Patent [19]
Heitmann et al.

[11] 3,788,068
[45] Jan. 29, 1974

[54] STEAM POWER PLANT, ESPECIALLY WITH A BOILING WATER NUCLEAR REACTOR

[75] Inventors: Hans-Gunter Heitmann, Buckenhof; Fritz Kelp, Erlangen, both of Germany

[73] Assignee: Kraftwerk Union AG, Mulheim, Ruhr, Germany

[22] Filed: Mar. 17, 1971

[21] Appl. No.: 125,147

[30] Foreign Application Priority Data
Mar. 21, 1970 Germany..........................2013679

[52] U.S. Cl..................................... 60/106, 137/571
[51] Int. Cl..... F22d 3/00, F22d 11/00, B01d 35/02
[58] Field of Search...... 60/105, 106, 107; 137/571, 137/575, 209, 210

[56] References Cited
UNITED STATES PATENTS
3,166,910 1/1965 Brunner............................... 60/107
3,338,055 8/1967 Gorzegno et al. ..................... 60/107

*Primary Examiner*—Martin P. Schwadron
*Assistant Examiner*—A. M. Ostrager
*Attorney, Agent, or Firm*—Curt M. Avery; Arthur E. Wilfond; Herbert L. Lerner and Daniel J. Tick

[57] ABSTRACT

Steam power plant includes a feedwater flow path, feed-water receptacle means located in the flow path, and feedwater degassing means also located in the flow path in the vicinity of the feedwater receptacle means, the feedwater receptacle means being divided into two separate vessels connected in series in the feedwater flow path, and a precipitating device having a magnetic filter connected in the feedwater flow path between the separate vessels of the feedwater receptacle means.

7 Claims, 2 Drawing Figures

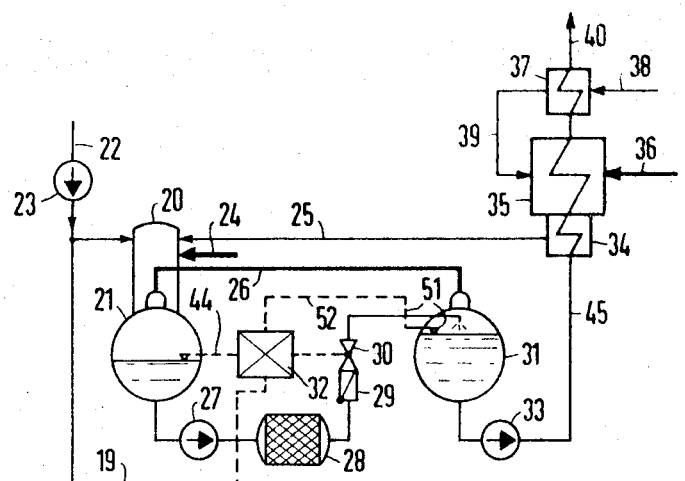
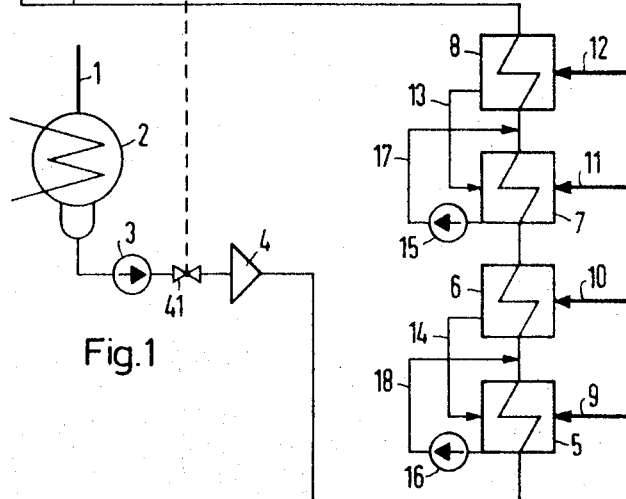
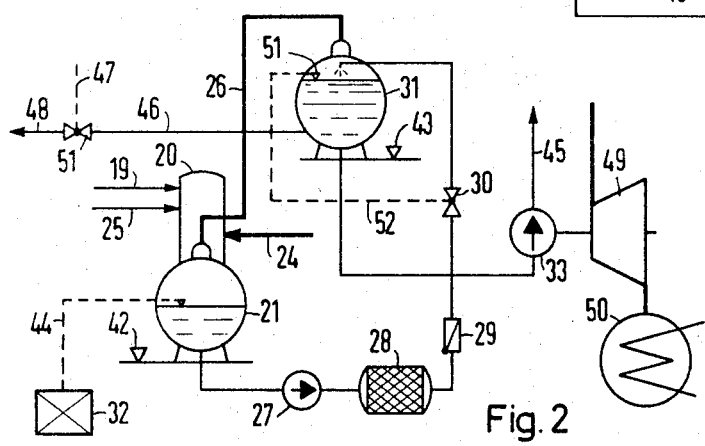
Fig. 1
Fig. 2

STEAM POWER PLANT, ESPECIALLY WITH A BOILING WATER NUCLEAR REACTOR

Our invention relates to steam power plant for a nuclear power station, especially with a boiling water reactor.

The content of suspended substances, especially iron oxides, makes itself noticeable even in conventional power plants due to the disruptive effect it may have on the operation thereof. In the case of nuclear power plants especially it can produce grave consequences because these substances penetrate into the reactor and threaten to become activated there and to deposit on the fuel elements. Consequently, in nuclear power plants with boiling water reactors, the feedwater preheater has been made of austenitic tubing material and partly, in addition, tube plates, water chambers and pipelines are clad or coated with these high quality materials.

Since steam condensate and feedwater nevertheless come into contact additionally with the surfaces of large parts made of ferritic structural steels, in numerous components of the plant, such as for example, the turbine, the tap or bleeder lines, the steam jackets of the preheaters, the condenser and the like, and this cannot be avoided with justifiable expense, further measures had to be seized upon to protect the feedwater against an unduly high content of impurities. Thus, all of the resulting condensate was drained off through all the preheater stages in cascade, with the intervention of suitable condensate coolers, and fed to the main condenser wherein, with the aid of special devices, a degassing is performed. The entire quantity which corresponds to the quantity of live steam, is accordingly passed, with the aid of the main condensate pumps, through a condensate purifying installation and finally, after flowing through the feedwater preheaters, is forced by the feedpumps into the reactor.

Such a system has the disadvantage, however, of being very expensive because all of the preheaters and coolers are exposed to the entire quantity of feedwater and at least the tubes thereof must be made of austenitic material, so that the degassing and storage of the feedwater can not take place between the low pressure and high pressure preheaters. It would also not be possible to locate the condensate purifying installation, which operates with ion exchange resins, and which could be made of economically-priced materials, downstream or behind the low-pressure preheaters, because the ion exchange resins would not be able to withstand the temperatures existing there. A condensate purifying installation must be provided, however, without fail, since it also represents an essential protective measure against the possible occurrence of slight coolant penetration in the condenser. To prevent chloride attacks upon the austenitic materials of the circulatory loop, such a condensate purifying installation is absolutely required.

In order to separate magnetic suspended impurities from condensates and feedwater, magnetically operating separators have been developed which can also be operated at very high temperatures. To reduce the cost of heating surfaces, for the low-pressure preheaters and condensate coolers, it has already been conceived to provide such separators for purifying the heat steam condensate, which is fed back again to the feedwater flow by means of secondary condensate pumps. This measure, which is in fact accompanied by economic advantages has the disadvantage, however, that the purified secondary condensate can pick up harmful substances anew on its further path to the reactor, especially in the water chambers and feedwater lines of the low-pressure preheaters, and a special separator installation is required for each quantity of secondary condensate.

One could also consider purifying the secondary condensate of the high-pressure preheater by magnetic separators and then introducing it into a feedwater receptacle with an excess pressure degasser to which the feedpumps are after-connected. Even though this measure would produce a noticeable or marked economizing of heat surfaces in the low-pressure preheaters, it demands, however, in addition to a further separator installation protective measures in the feedwater receptacle and degasser, for example, cladding or coating with austenitic materials, which would be very costly for the required size of such receptacles.

If one should wish, when employing the aforementioned changes in the connecting of the circulatory system, to after-connect the required separator device to the boiler feed pumps, this would hardly be realizable due to the high pressure present there, and would mean at least a non-justifiable expense. The attempt to connect the separator in the suction lines of the feedpumps would fail for operational reasons alone, because the separators exhibit different flow-through or through-put resistances according to the extent of soiling thereof, so that the suction or induction rates, especially for parallel flow of several feedpumps are adversely affected in a decisive manner. It would also be disadvantageous that for each feedpump, a separate separator installation would be required inclusive of all expense for monitoring, reflushing and the like.

It is accordingly an object of our invention to provide steam power plant which avoids all of the aforementioned disadvantages of the heretofore known steam power plants.

With the foregoing and other objects in view, we provide in accordance with our invention, in a steam power plant, a feedwater flow path, feedwater receptacle means located in the flow path and feedwater degassing means also located in the flow path in the vicinity of the feedwater receptacle means, the feedwater receptacle means being divided into two separate vessels connected in series in the feedwater flow path, and a precipitating device having a magnetic filter connected in the feedwater flow path between the separate vessels of the feedwater receptacle means.

In accordance with other features of the invention, both vessels are mutually connected through a steam equalizing or compensating line. Furthermore, a feed pump is connected between the separated vessels.

In accordance with further features of the invention, the feedwater degassing means are provided at one of the vessels of the feedwater container means, the feedwater and all of the condensate being introduced into the feedwater degassing means and the first vessel. With the air of a pump, all of the feedwater is then fed from the first vessel through the precipitating device provided with an electromagnetic filter into the second vessel to which the suction or induction lines of the feed pumps are connected. The second vessel is at the same pressure and has the same water level as the first vessel, the feed pump feeding the feedwater to the second vessel so that water levels of equal height are present in both vessels. Equalization or compensation of the steam cushion is then effected through the steam compensating line connecting the first and second vessels.

In accordance with a modified form of the invention, the second vessel is located at a higher, especially at a much higher level with respect to the first vessel.

If a constant water level is maintained as high as possible, especially favorable feed rates for the feed pumps are provided in this manner so that preliminary pumps can be dispensed with, and the installation of the pumps, especially with turbine drives with their own condensation is possible in any desirable way. Furthermore, the continuously present charge of the higher vessel can be used as a reliable reserve of pressurized water in the event or extraordinary operating conditions and mishaps.

Quite to the contrary, in accordance with a further modified form of the invention, the second vessel can be located below the first vessel so that the feedwater flows from the first to the second vessel through the precipitator device by gravity flow without requiring a pump.

Other features which are considered as characteristic for the invention are set forth in the appended claims.

Although the invention is illustrated and described herein as embodied in steam power plant, especially with a boiling water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a section of a simplified thermal circuit diagram of a boiling water reactor and turbine installation in the region wherein the feedwater is preheated; and FIG. 2 is a fragmentary view of FIG. 1 showing a modified disposition of the feedwater vessels thereof.

Referring now to the drawing and first, particularly to FIG. 1 thereof, there is shown therein a turbine exhaust steam line 1 through which steam is admitted to a condenser 2 where it is precipitated. The condensate that thus results is fed through a control valve 41 and a chemical condensate processing system 4 with the aid of a main condensate pump 3. The tube systems of low pressure preheaters 5, 6, 7 and 8 are serially connected to the condensate processing system 4. Bleeder or tap lines 9, 10, 11 and 12 from a non-illustrated turbine conduct superheated steam individually to the preheaters 5 to 8, respectively. The steam condenses in the preheaters, the condensate in the preheaters 8 being conducted through the line 13 to the preheater 7 while the condensate formed in the preheater 6 flows through the line 14 into the preheater 5. The condensate is forced out of the preheater 7 by a pump 15 and fed through the line 17 to the feedwater flow. In a similar manner, a pump 16 feeds the condensate formed at the preheater 5 through the line 18 for intermixing with the feedwater flow.

The feedwater heated in the preheaters passes through the line 19 to a deaerator or degasser 20 and from there into a first feedwater vessel 21. A quantity of water is delivered from non-illustrated intermediate steam driers through a line 22 and is fed by a pump 23 to the degasser 20. In addition, turbine-bled or tapped steam also is fed through a line 24 into the degasser 20 in order to ensure the required preheating and degassing. Finally, the condensate of a high pressure preheater 35 and a condensate cooler 34 are conducted through a line 25 to the degasser 20.

The feedwater flown out of the first feedwater receptacle 21 to the pump 27, which then feeds the feedwater successively through the magnetic precipitating device 28, a check valve 29 and a control valve 30 to a second feedwater receptacle 31. A control device 32 is provided to which the control valves 30 and 41, on the one hand, and the water level sensors and transmitters 44 and 51, on the other hand, of the receptacles 21 and 31, respectively, are connected. The control device 32 maintains a predetermined water level in both receptacles 21 and 31, which are connected to one another by a steam equalizing or compensating line 26.

The feedwater is advanced from the second receptacle 31 through a main feed pump 33 over a line 45 successively through the high-pressure condensate cooler 34, the high-pressure preheater 35 and the high-pressure condensate cooler 37, and over a line 40 to the non-illustrated boiling water nuclear reactor. The high-pressure compensate cooler 37 receives the condensate of a non-illustrated steam-heated intermediate superheater through the line 38 and, after the condensate has cooled, it flows through the line 39 into the high-pressure preheater 35. The latter is heated by steam bled or tapped from the non-illustrated turbine and delivered thereto through the line 36. The condensate produced in the high-pressure preheater 35 flows through the condensate cooler 34 and to the degasser 20 through the line 25.

In FIG. 2 there is shown a modified embodiment of the feedwater vessel assembly of FIG. 1. In contrast to the embodiment of FIG. 1, wherein both component vessels 21 and 31 are located at the same level with respect to the ground, the component vessel 21 in the embodiment of FIG. 2 is located at a lower geodetic level 42 in the lower region of the installation, while the component vessel 31 is located at a much higher elevation at the geodetic level 43. Both vessels 21 and 31 are again mutually connected by a steam equalizing or compensating line 26.

Also in the embodiment of FIG. 2, the feedwater flows through the line 19 into the degasser 20, which is connected with the component vessel 21, water from the water separators or precipitators being also fed thereto, if necessary. The condensate of the non-illustrated high-pressure preheater is fed to the degasser 20 through the line 25 as in the embodiment of FIG. 1. The degasser 20 is heated by steam tapped from the non-illustrated turbine and delivered thereto through the line 24.

The feedwater of the first component vessel 21 travels in a manner similar to that shown in FIG. 1 along a flow path through the pump 27, the precipitator device 28, the check valve 29 and the control valve 30 into the second component vessel 31 from which it flows to the pump 33 and from there through the line 45 to the high-pressure preheater 35.

The pump 33, which is the main boiler feed pump, is driven by a steam turbine 49, it being advantageous that the difference in elevation between the component vessel 31 at the level 43 and the inlet tubes to the boiler feed pump 33 be so great that even during extraordinary operating conditions no cavitation can enter the pump. Furthermore, the pump is so disposed that a condenser 50 of the driving turbine 49 is located at a desirable and most optimal level with regard to the feeding of the cooling water and the like.

A line 46 branches off from the component vessel 31 at the level 43, the line 46 being closed by the valve 51 during normal operating conditions. If the supply of reactor cooling water should suddenly fail due to a mishap such as a sudden drop in electric current, for example, for driving the feed pumps or due to damage to the pump-turbine assembly 30, 49, 50, the valve 51 is opened, as represented by the dotted line 47, and cooling water is then fed into the non-illustrated nuclear reactor through the line 48, in addition to the institution of other protective measures not essential to the invention of the instant application. The component vessel 31 is of such dimensions that the content of degassed purified feedwater therein, which is not at a very high temperature, can be used during such critical operating conditions.

The control device 32 shown in FIG. 1 and a corresponding control device for the embodiment of FIG. 2 provide for controlling the main condensate pump 3, and the control valve 41 associated therewith, in such a way that the water level in the component receptacle 21 is located at a desired elevation within a predetermined allowable range. In contrast thereto, a higher water level is maintained in the second feedwater component receptacle 31, whereby the water level sensor and transmitter 51 controls the valve 30 through the signal lines 52 directly or through the control device 32. For the aforementioned reasons, it is advantageous always to have a water level that is as high as possible. The volume of stored feedwater is divided between the component receptacles 21 and 31 so that all of the deviations in the quantity thereof occurring during operation of the system can take place or be absorbed only in the component receptacle 21, while a constant volume thereof which is as large as possible is stored in the component receptacle 31 so as to be available at this location of the installation for reasons of safety.

Obviously, though not shown in the drawing, the second component receptacle 31 can be located so far below the first component receptacle 21 that the feedwater reliably flows through the precipitating device to the second component receptacle 31 without requiring the presence of the pump 27.

The invention not only offers the advantage of a marked reduction in the heating surfaces of the low-pressure preheaters, but also permits them, moreover, to be made of ferritic material, which represents a considerable economy. Moreover, adequately large supply receptacles and trouble-free supply rates are assured for all the feedwater pumps. Minimum expense is required for the precipitation of impurities and corrosion products from the feedwater. The division into two separate component receptacles of the large feedwater storage capacity, which is required for safety reasons, provides marked economies, in addition to advantages with respect to manufacture, planning and assembly, because only one of the two component receptacles or vessels need be protected or shielded.

We claim:

1. In a steam power plant of the type having a boiling water reactor, comprising a feedwater flow path, a first and a second feedwater vessel connected in series in said flow path, a steam equalizing line connecting said first and second feedwater vessels to one another, a feedwater deaerator means connected to said first feedwater vessel, means for introducing all occurring condensate into said deaerating means, preheaters connected in said feedwater flow path upstream of said first feedwater vessel, said preheaters and said first feedwater vessel being formed of ferritic material, a plurality of devices located in said feedwater flow path downstream of said second feedwater vessel, said devices and said second feedwater vessel being at least partially protectively formed of austenitic material at locations thereof engageable by the feedwater flow, and a precipitating device having a magnetic filter connected in said feedwater flow path between said first and second feedwater vessels.

2. Steam power plant according to claim 1 including a pump connected upstream of said precipitating device in said feedwater flow path.

3. Steam power plant according to claim 1 wherein a first one of said two separate vessels is located at a low position of the plant and the second one of said vessels is located at a high level of the plant.

4. Steam power plant according to claim 1 wherein the vessel located in said feedwater flowpath downstream of the other vessel is at a level lower than that of said other vessel so that the feedwater passes through said precipitator means by gravity flow.

5. Steam power plant according to claim 1 including control means for maintaining a given water level in the vessel located upstream of the other vessel in said feedwater flow path for damping deviations in the quantity of water appearing therein during operation of the plant, while maintaining the highest possible constant level in the other vessel.

6. Steam power plant according to claim 5 including means for regulating condensate feed to said feedwater flow path, said control means being operatively connected to said condensate feed regulating means for controlling the same.

7. Steam power plant according to claim 1 including safety means connected to the one vessel located in said feedwater flow path downstream of the other of said two vessels, and actuable, in event of an operational mishap, for applying the content of said one vessel for cooling parts of the plant.

* * * * *